United States Patent
Chaabouni et al.

(10) Patent No.: US 9,022,112 B2
(45) Date of Patent: May 5, 2015

(54) CHELANT BASED SYSTEM AND POLYLACTIDE RESIN FOR ACID DIVERSION

(75) Inventors: Hassan Chaabouni, Tunis (TN); Sherif Sharkass, Aberdeen (GB); Olubiyi Olaoye, Vechta (DE); David Sobernheim, Cypress, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 492 days.

(21) Appl. No.: 13/111,674

(22) Filed: May 19, 2011

(65) Prior Publication Data

US 2011/0284222 A1    Nov. 24, 2011

Related U.S. Application Data

(60) Provisional application No. 61/346,656, filed on May 20, 2010.

(51) Int. Cl.

| | |
|---|---|
| *E21B 43/22* | (2006.01) |
| *E21B 43/26* | (2006.01) |
| *C09K 8/68* | (2006.01) |
| *C09K 8/035* | (2006.01) |
| *C09K 8/74* | (2006.01) |

(52) U.S. Cl.
CPC . *C09K 8/68* (2013.01); *C09K 8/035* (2013.01); *C09K 8/74* (2013.01); *C09K 2208/08* (2013.01); *C09K 2208/30* (2013.01)

(58) Field of Classification Search
CPC .............. C07K 7/08; C07K 7/64; C09K 8/68; C09K 2208/30; E21B 37/00
See application file for complete search history.

(56) References Cited

U.S. PATENT DOCUMENTS

| | | | |
|---|---|---|---|
| 5,551,516 A | 9/1996 | Norman et al. | |
| 5,964,295 A | 10/1999 | Brown et al. | |
| 5,979,555 A | 11/1999 | Gadberry et al. | |
| 5,979,557 A | 11/1999 | Card et al. | |
| 6,140,277 A | 10/2000 | Tibbles et al. | |
| 6,258,859 B1 | 7/2001 | Dahayanake et al. | |
| 6,509,301 B1 | 1/2003 | Vollmer et al. | |
| 6,637,517 B2 | 10/2003 | Samuel et al. | |
| 7,219,731 B2 | 5/2007 | Sullivan et al. | |
| 7,350,572 B2 | 4/2008 | Fredd et al. | |
| 7,380,600 B2 | 6/2008 | Willberg et al. | |
| 7,565,929 B2 | 7/2009 | Bustos et al. | |
| 7,666,821 B2 | 2/2010 | Fu | |
| 7,775,278 B2 | 8/2010 | Willberg et al. | |
| 2009/0255677 A1* | 10/2009 | Bryant et al. | 166/300 |
| 2011/0094737 A1* | 4/2011 | Chen et al. | 166/268 |

* cited by examiner

*Primary Examiner* — Zakiya W Bates
(74) *Attorney, Agent, or Firm* — Jeremy D. Tillman; Rachel Greene; Tim Curington

(57) ABSTRACT

Compositions and methods for treating a subterranean formation including forming a fluid comprising chelant and polylactide resin fiber; and introducing the fluid to a subterranean formation, wherein the temperature of the formation is about 300° F. or warmer. Compositions and methods for treating a subterranean formation including forming a fluid comprising viscoelastic surfactant, trisodium hydroxyethyl-ethylenediamine-triacetate and polylactide resin fiber; and introducing the fluid to a subterranean formation, wherein the temperature of the formation is about 300° F. or warmer.

17 Claims, 1 Drawing Sheet

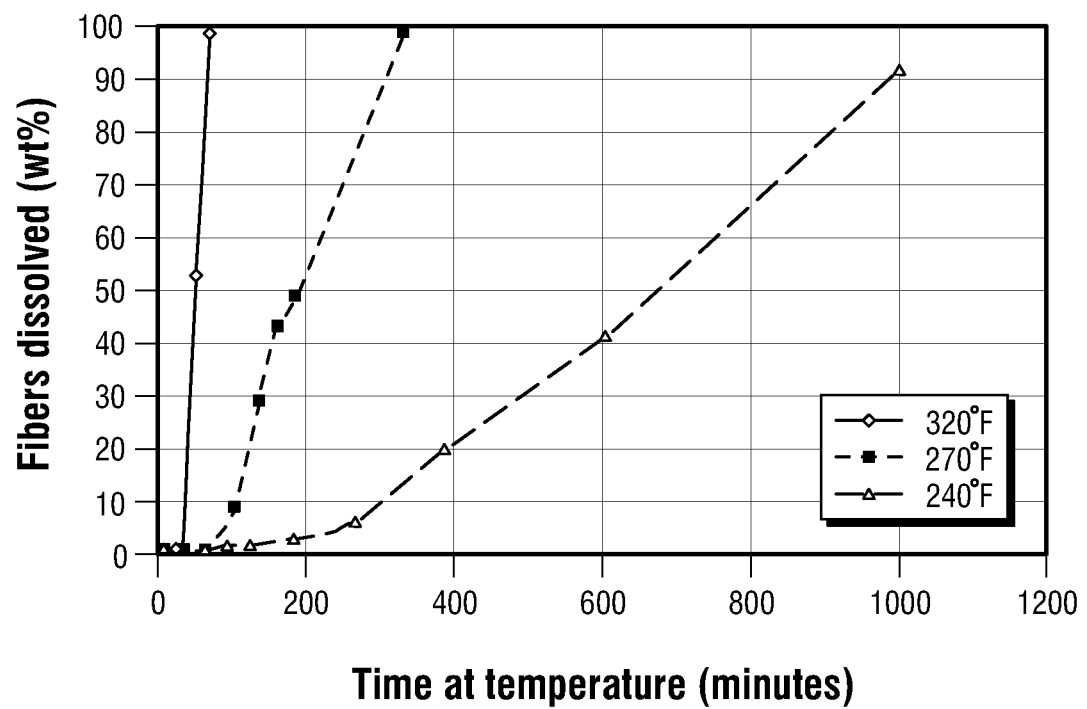

CHELANT BASED SYSTEM AND POLYLACTIDE RESIN FOR ACID DIVERSION

PRIORITY

This application claims priority to U.S. Provisional Patent Application No. 61/346,656, filed May 20, 2010, entitled, "CHELANT BASED SYSTEM AND POLYLACTIDE RESIN FOR ACID DIVERSION." The application is incorporated by reference herein.

BACKGROUND

Embodiments of the invention relate to stimulation of wells penetrating subterranean formations. In particular it relates to methods and compositions for the execution of multiple sequential well treatments and the temporary protection of previous treatments from subsequent treatments using a diversion technique.

Hydrocarbons (oil, condensate, and gas) are typically produced from wells that are drilled into the formations containing them. For a variety of reasons, such as inherently low permeability of the reservoirs or damage to the formation caused by drilling and completion of the well, the flow of hydrocarbons into the well may be undesirably low. In this case, the well is stimulated, for example using hydraulic fracturing, chemical (usually acid) stimulation, or a combination of the two (called acid fracturing or fracture acidizing).

Hydraulic fracturing involves injecting fluids into a formation at high pressures and rates such that the reservoir rock fails and forms a fracture (or fracture network). Proppants are typically injected in fracturing fluids after the pad to hold the fracture(s) open after the pressures are released. In chemical (acid) stimulation treatments, flow capacity is improved by dissolving materials in the formation.

In hydraulic and acid fracturing, a first, viscous fluid, often called a pad, is typically injected into the formation to initiate and propagate the fracture. This is followed by a second viscous fluid that contains a proppant to keep the fracture open after the pumping pressure is released. Granular proppant materials may include sand, ceramic beads, or other materials. In acid fracturing, the second fluid contains an acid or other chemical such as a chelating agent that can dissolve part of the rock, causing irregular etching of the fracture face and removal of some of the mineral matter, resulting in the fracture not completely closing when the pumping is stopped. When confinement of the fracture geometry is required, the use of surfactant based fluids such as viscoelastic surfactants (VES) is recommended. Occasionally, hydraulic fracturing is done by pumping at very high rates a low viscosity fluid containing friction reducing polymers (i.e., slick water) to minimize the damage caused by highly concentrated polymers or the cost of other viscosifiers. In addition, to further minimize the damage, low viscosity surfactant based fluids can be utilized as slickwater treatments.

When multiple hydrocarbon-bearing zones are stimulated by hydraulic fracturing or chemical stimulation, it is desirable to treat the multiple zones in multiple stages. In multiple zone fracturing, a first pay zone is fractured. Then, the fracturing fluid is diverted to the next stage to fracture the next pay zone. The process is repeated until all pay zones are fractured. Alternatively, several pay zones may be fractured at one time, if they are closely located with similar properties. Diversion may be achieved with various means. In the bridge plug technique (BPT), for example, the operator perforates, then fractures, then sets a bridge plug tool, and then repeats this process as necessary. This approach ensures 100% positive zone isolation by setting a packer between fractured and targeted zones. However, this approach is extremely costly. The costs come from extensive wireline service intervention, which requires additional time to perforate and to set and then retrieve the packer from the wellbore for each pay zone before and after a fracturing treatment. In addition, packer retrieval is sometimes risky.

In the flow through composite bridge plug (FTCBP) approach, which is a modification of the BPT, the FTCBP tool works as a BPT plug when there is higher pressure above it, such as during subsequent fracturing treatment. However, when the pressure is higher below the plug, such as when flowing the well back, the FTCBP lets fluid flow from below through the plug. Use of the FTCBP technique allows all preceding fractured zones to flow during completion of the well. This method has two advantages. First, it considerably reduces the shut-in time by flowing each fracture back early. Second, all previously treated zones help to clean up each new treatment. After a well is completed, the FTCBP can be drilled out easily or can be left in the well. This technique has proven to be a reliable tool that increases production. The main disadvantage is the cost and time needed to set the plug.

The sand plug technique (SPT) is similar to the BPT except that sand plugs are used instead of tools. The main idea is to fracture several pay zones sequentially via different perforation sets and set a sand plug at the end of each treatment stage to prevent flow beyond the plug, and thus divert the stress field for successive stages. This method substantially reduces time and costs because it requires no packer retrieval. However, due to initial in-situ stress variations, not all zones may be fractured. Furthermore, the proppant placement requires loading the wellbore with proppant, which may result in low efficiency of the treatment.

The limited entry (LE) approach, which is a simplified technique that does not require loading the wellbore with sand, makes the method more affordable. The method is used, for example, in combination with ball sealers to plug the stages, or by having differing numbers of perforations for the different stages. The LE method basically relies on creating an artificial pressure drop across a calculated number of perforations. From the number of perforations, the size of the perforations, and the injection rate, the pressure drop is calculated. This pressure differential is then adjusted through the number of perforations to create a designated pressure on the formation side of the perforations equal to the fracturing pressure. Knowing the exact fracturing pressure of each sand layer is an essential portion of the limited entry technique. In an infill-drilling program within a stratigraphic pay, the pressure of any given sand can vary considerably. Acquiring reliable pressure data involves testing each zone, adding time and cost to the completion. Without knowing the exact data, a treatment may result in little or no production from some sets of perforations.

The induced stress diversion technique (ISDT) is an application of staged hydraulic fracturing treatments without the use of any positive isolation, such as bridge plugs, frac baffles, sand plugs, or ball sealers. The ISDT combines the advantages of the LE and multi-staged fracturing techniques. The ISDT procedure may be used to perforate and fracture multiple, discrete pay intervals by repeating the process as many times as needed. Some ISD techniques may include methods to induce screenouts to help with the diversion.

However, the ISDT requires good knowledge of reservoir properties. This makes ISDT not easily repeatable in areas with varying properties. To achieve maximum stress diversion, an optimized fracturing treatment is required based on mechanical properties of the formation. This often requires acquiring data using a design tool, such as a DataFRAC™. (Trade name of Schlumberger Technology Corp.), and successive redesigns of the approach. This takes time. In addition, redesign is strongly dependent on critical assumptions about formation properties. As a result, currently there is no reliable methodology to justify the use of ISDT in tight gas reservoirs. Therefore, there still exists a need for easy and reliable methods for diversion, multi-stage fracturing, or temporary sealing in the downhole environment.

Degradable materials have been used for fluid loss control and for diversion in the past. Examples include rock salt, graded rock salt, benzoic acid flakes, wax beads, wax buttons, oil-soluble resin material, etc. Degradable materials have been used in other downhole operations. However, these materials have generally been used in sizes, shapes, and concentrations designed to build filter cakes on wellbore or fracture faces rather than to form consolidated plugs in wellbores, perforations, or fractures, e.g. under screen out conditions.

FIGURES

FIG. 1 is a chart that compares fiber dissolution as a function of temperature.

SUMMARY

Embodiments of the invention relate to compositions and methods for treating a subterranean formation including forming a fluid comprising chelant and polylactide resin fiber; and introducing the fluid to a subterranean formation, wherein the temperature of the formation is about 300° F. or warmer. Embodiments of the invention relate to compositions and methods for treating a subterranean formation including forming a fluid comprising viscoelastic surfactant, trisodium hydroxyethylethylenediamine-triacetate and polylactide resin fiber; and introducing the fluid to a subterranean formation, wherein the temperature of the formation is about 300° F. or warmer.

DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The statements made herein merely provide information related to the present disclosure and may not constitute prior art, and may describe some embodiments illustrating the invention.

A diverter for matrix acidizing operations for temperatures above 300 degF is needed. Using an acid/chelant system suitable for high temperatures (Can be inhibited above 300 degF) that can be viscosified optionally using VES is desired.

For some embodiments using carbonate reservoirs, a chelant based system may be used as the base acid system. Then, optionally viscosify the system using VES surfactant and add the degradable fibers to it. The fibers will accumulate in the perforation tunnels or barefoot completions to temporally plug thief zones and ensure proper treatment coverage. In some embodiments, the system will be used as a standalone solution or the system may be alternated with another acid or chelant system to ensure the proper treatment coverage of a long producing reservoir or reservoirs with high permeability contrast. The system can be used for reservoirs producing from matrix or fractures. Fibers will degrade and decompose over time.

In some embodiments, the chelant based system contains trisodium hydroxyethylethylenediamine-triacetate. In some embodiments the fibers comprise polylactide resin. In embodiments of the invention, systems of the invention made of degradable polymers are especially useful in conjunction with viscoelastic surfactant (VES) fluid system. VES fluid system is a fluid viscosified with a viscoelastic surfactant and any additional materials, such as but not limited to salts, co-surfactants, rheology enhancers, stabilizers and shear recovery enhancers that improve or modify the performance of the viscoelastic surfactant.

The useful VES's include cationic, anionic, nonionic, mixed, zwitterionic and amphoteric surfactants, especially betaine zwitterionic viscoelastic surfactant fluid systems or amidoamine oxide viscoelastic surfactant fluid systems. Examples of suitable VES systems include those described in U.S. Pat. Nos. 5,551,516; 5,964,295; 5,979,555; 5,979,557; 6,140,277; 6,258,859 and 6,509,301, which are all hereby incorporated by reference. The system of the invention is also useful when used with several types of zwitterionic surfactants. In general, suitable zwitterionic surfactants have the formula:

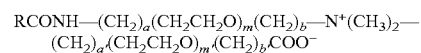

in which R is an alkyl group that contains from about 14 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and the O in either or both $CH_2CH_2O$ groups or chains, if present, may be located on the end towards or away from the quaternary nitrogen. Preferred surfactants are betaines.

Although the invention has been described using the term "VES", or "viscoelastic surfactant" to describe the non-polymeric viscosified well treatment fluids, other non-polymeric materials may also be used to viscosify the fluid provided that the requirements described herein for such a fluid are met, for example the required viscosity, stability, compatibility, and lack of damage to the wellbore, formation or fracture face.

To facilitate a better understanding of the present invention, the following examples of certain aspects of some embodiments are given. In no way should the following example be read to limit, or define, the scope of the invention.

Testing of the compatibility of the chelant based system with the polylactide resin fibers was performed. The system may contain a corrosion inhibitor and the pH may be adjusted. The lab performed compatibility analysis of a chelant based system treatment fluid with added polylactide resin fibers for British Gas Tunisia for use in their Miskar field. The polylactide resin fibers are added to the carbonate dissolving fluid to allow diversion from the naturally occurring fractures in the formation and thief zones.

A sample of the mix water and an analysis of the formation water was given, so that simulated brines could be constructed in our laboratory for the required analysis. The expected bottom hole static temperature was given as 320° F. and the pumping time for the proposed treatment was approximately 3 hours. The pumping schedule prediction supplied by the technical engineer indicated that the well bore should cool down to around 220° F. before the diversion stages of the treatment.

In order to assess whether the treatment would meet the requirements for the job, the following analysis was undertaken:

Analysis of supplied mix water sample to allow preparation of enough simulated mix water for the required analysis.

Mix the chelant based system treatment fluid with polylactide resin fibers to ensure the fibers can disperse properly in the treatment fluid and select a suitable polylactide resin fiber concentration of between 50 and 100 ppt (assess pump ability).

Investigate whether the polylactide resin fibers disperse better when 5% VES VES gelling agent is added to the treatment design.

Perform bottle compatibility tests between chelant based system+polylactide resin fluid and the simulated formation water at surface and bottom-hole conditions.

Perform dissolution testing of the polylactide resin fibers in chelant based system at various bottom-hole temperatures, to assess how long it takes for the fibers to become brittle and fully hydrolyzed in the chelant based system treatment fluid.

Carbonate dissolution capacity testing of the chelant based system fluid (base line test), the chelant based system fluid with 50 ppt polylactide resin fibers and the chelant based system fluid with 50 ppt of hydrolyzed polylactide resin fibers, to confirm similar dissolving capacity at 180° F. under atmospheric conditions.

Retained brine permeability testing on a representative core sample from the Miskar field following injection of the chelant based system treatment with hydrolyzed polylactide resin fibers in the fluid, to be performed at the maximum bottom hole static temperature of 320° F.

Given chelant based system fluid design:

| 495 gpt | mix water |
| 451.4 gpt | chelating agent |
| 49.6 gpt | 33 wt % hydrochloric acid |
| 1 gpt | surfactant |
| 3 gpt | corrosion inhibitor |

Note:
ppt = pounds per thousand gallons,
gpt = gallons per thousand gallons

A sample of polylactide resin fibers was supplied from the Tunisia district. The remaining additives used for the analysis were taken from lab stock.

1. Analysis of Supplied Mix Water

The supplied mix water was analyzed to establish the common ions present in oil field waters. The analysis was undertaken using methods utilising Hach a digital titrator and DR2010 spectrophotometer.

A summary of the results is given in Table 1.

All the mix water used for the required analysis was constructed using this analysis from distilled water and laboratory grade salts.

TABLE 1

| Composition of supplied mix water | | | |
|---|---|---|---|
| Anions | Concentration (mg/L) | Cations | Concentration (mg/L) |
| Chloride | 374 | Sodium (by calculation) | 179 |
| Sulphate | 360 | Calcium | 109 |
| Bicarbonate | 3.4 | Magnesium | 58.8 |
| Carbonate | 0 | Barium | 1 |
| Hydroxide | 0 | Iron | <0.1 |

1. Mixing the Chelant Based System with Polylactide Resin Fibers

The given chelant based system treatment fluid was mixed with polylactide resin to check whether the fibers dispersed and suspended properly at two fiber concentrations of 50 and 100 ppt. In addition, 5% VES gelling agent was added to the treatment designs to assess whether the fibers disperse and suspend better a gelled chelant based system fluid. All fluids were mixed and observed at ambient temperature. The method used to mix the fluids is detailed in the Appendix.

The observations of the mixed fluids are summarised in Table 2 and a photographic record of each is shown in Plate 1. The 100 ppt loading of polylactide resin is more difficult to disperse in the chelant based system and tends to clump during mixing. When VES gelling agent is added the fluid becomes very viscous. The 50 ppt loading of polylactide resin appears to disperse more efficiently into the chelant based system and does not appear to require gelling agent to maintain the fibers in suspension under lab mixing conditions.

Given chelant based system fluid design:

| 495 gpt | Mix water |
| 451.4 gpt | chelating agent |
| 49.6 gpt | 33 wt % hydrochloric acid |
| 1 gpt | surfactant |
| 3 gpt | corrosion inhibitor |

Note:
Some of the corrosion inhibitor has a tendency to plate out on the surface of the fluid while it is static.

Gelled versions include:

| 50 gpt | VES, VES gelling agent |

TABLE 2

Mixing of chelant based system with polylactide resin fibers

| POLYLACTIDE RESIN added (ppt) | 5% VES Added | Mixing Comments | Fiber dispersion Comments | Fiber suspension Comments | Fluid pumping comments |
|---|---|---|---|---|---|
| 50 | No | fibers easily mixed into the chelant based system fluid | Dispersed well with minimal clumping | No settling observed over 16 hours - slight tendency to float | No problems envisaged |
| 50 | Yes | fibers do not mix easily into gel - mixed better in the base chelant based system fluid | Dispersed well with minimal clumping | No settling observed over 16 hours, 10% have floated | No problems envisaged although quite viscous |
| 100 | No | fibers easily mixed into the chelant based system fluid | Dispersed well but tended to clump together, especially after high mixing force. | No settling observed over 16 hours - slight tendency to float | The clumping may result in plugging |
| 100 | Yes | fibers do not mix easily into gel - mixed better in the base chelant based system fluid | Dispersed well but tended to clump together especially after high mixing force. | No settling observed over 16 hours, 2% have floated | The high viscosity may cause problems |

Chelant based system fluids with 50 ppm and 100 ppm polylactide resin fibers and 50 ppm and 100 ppm polylactide resin fibers and VES gelling agent were observed in settling tests.

Photos were taken after mixing, and again after 16 hours. Visual observations indicate the material remained relatively evenly dispersed over time and that those samples containing VES underwent very slightly less fiber dissolution over time.

Compatibility Testing

Compatibility testing was undertaken with the chelant based system fluid with 50 ppt polylactide resin fibers added. A sample of the treatment fluid was heated in a pressurised cell to 320° F. and maintained at this temperature for 24 hours to allow the fibers to fully hydrolyze in the chelant based system fluid.

The chelant based system fluid with hydrolysed fibers was mixed with the simulated formation brine (composition detailed in Appendix 2) in Duran bottles at a 50:50 mixing ratio. One sample was maintained at ambient temperature and another was heated up to the bottom hole static temperature of 320° F. in a pressurized cell.

After 24 hours the bottle were cooled as required and the liquid inspected for signs of incompatibility. The photographic record shows that neither show any incompatibility between the two liquids.

2. Dissolution Testing of the Polylactide Resin Fibers in Chelant Based System at Various Bottom-Hole Temperatures The chelant based system and 50 ppt polylactide resin fluid was prepared as detailed in Appendix 1. An 80 ml sample of the fluid was added to a number of HTHP cells and heated to the required temperature: 320, 270 and 240° F. For each temperature, a number of tests were performed with increasing duration up to 1000 minutes, so that the rate of hydrolyzing/dissolving of the polylactide resin fibers in chelant based system could be established at each temperature.

The results of the analysis detailed in Tables 3 to 5 and graphically in FIG. 1 show that to maintain diversion with the polylactide resin fibers in the chelant based system fluid for 3 hours, the well bore temperature should be cooled below to 240° F. or below. At temperatures above 240° F. the fibers will start to break and hydrolyse after approximately 4 hours. At the bottom static temperature of 320° F. the fibers melt within 20 minutes and completely hydrolyse after approximately 70 minutes.

Photographic records also show similar visual results.

TABLE 3

Dissolution of 50 ppt polylactide resin fibers in chelant based system fluid at 320° F.

| Time (minutes) | Dissolution (wt %) | Observations of fibers |
|---|---|---|
| 0 | 0.0 | As mixed |
| 20 | 0.0 | No dissolution but fibers melted into one blob |
| 30 | 1.0 | Little dissolution blob dispersing |
| 50 | 53.1 | Numerous small fragments of melted fiber |
| 70 | 99.0 | Almost completely dissolved |

TABLE 4

Dissolution of 50 ppt polylactide resin fibers in chelant based system fluid at 270° F.

| Time (minutes) | Dissolution (wt %) | Observations of fibers |
|---|---|---|
| 0 | 0 | As mixed |
| 20 | 0.6 | No obvious change to fibers |
| 50 | 1.3 | Slight compaction and discoloration (brown) |
| 90 | 9.4 | More compaction of dark brown fibers |
| 120 | 29.3 | Broken dark brown fibers |
| 150 | 43.5 | Broken dark brown fibers |
| 175 | 49.2 | Broken dark brown fibers |
| 320 | 99.2 | Almost complete dissolution |

TABLE 5

Dissolution of 50 ppt polylactide resin fibers in chelant based system fluid at 240° F.

| Time (minutes) | Dissolution (wt %) | Observations of Fibers |
|---|---|---|
| 0 | 0 | As mixed |
| 50 | 1 | No obvious change to fibers |
| 80 | 1.9 | Slight compaction and discoloration (light brown) |
| 110 | 2.1 | Slight compaction and discoloration (light brown) |
| 170 | 3.3 | Slight compaction and discoloration (light brown) |
| 240 | 6.5 | Slight compaction and discoloration (light brown) |
| 373 | 20.1 | Broken dark brown fibers |
| 600 | 41.6 | Broken dark brown fibers |
| 1000 | 91.6 | Almost complete dissolution |

3. Carbonate Dissolution Capacity of Various Chelant Based System Fluids

The carbonate dissolving capacity the following chelant based system fluids was performed at 180° F.:
a. Chelant based system with 50 ppt of fully hydrolyse polylactide resin fibers
b. Chelant based system with 50 ppt polylactide resin fibers present
c. Chelant based system The aim of the tests was to demonstrate that the presence of hydrolysed fibers or un-dissolved fiber would not have an effect on the efficiency of the chelant based system at dissolving calcium carbonate.

A 250 ml sample of each fluid was placed in a beaker and 25 g of fine marble chips was added to each. The beakers were placed in a water bath heated to 180° F. and left for 4 hours to allow the reaction to complete. After four hours the residue was cooled and the remaining un-dissolved marble chips filtered off and weighed.

The calcium carbonate dissolving capacity of each selected fluid was determined as detailed in Table 6. The results show that all three fluids dissolved similar amounts of calcium carbonate.

TABLE 6

Carbonate dissolution capacity of various chelant based system fluids

| Fluid | Calcium carbonate dissolution (g/L) |
|---|---|
| chelant based system with 50 ppt of fully hydrolysed polylactide resin fibers | 60.9 |
| chelant based system with 50 ppt polylactide resin fibers present | 64.0 |
| chelant based system | 63.2 |

Fluid Mixing Procedures

The given chelant based system fluid design:

| | | |
|---|---|---|
| 495 | gpt | Mix water |
| 451.4 | gpt | chelating agent |
| 49.6 | gpt | 33 wt % hydrochloric acid |
| 1 | gpt | surfactant |
| 3 | gpt | corrosion inhibitor |

Base Chelant Based System Mixing:
1. Place 495 ml mix water in beaker
2. While stirring add 451.4 ml chelating agent
3. Continue mixing and add 49.6 ml 33% hydrochloric acid.
4. Add 3 ml of corrosion inhibitor
5. Add 1 ml of surfactant Mixing Chelant Based System Fluid with Polylactide Resin Fibers:
1. Pour 500 ml of prepared chelant based system fluid into a beaker
2. Weigh out the required amount of polylactide fibers (50 ppt=2.995 g) and place in grinder.
3. Shear the fibers for 20 seconds to fluff up before adding them to the base fluid.
4. Stir the fluid a low shear to disperse the fibers.

Gelled Chelant Based System Mixing:
1. Pour 475 ml of prepared chelant based system fluid into a beaker
2. Weigh out the required amount of polylactide fibers (50 ppt=2.995 g) and place in grinder.
3. Shear the fibers for 20 seconds to fluff up before adding them to the base fluid.
4. Stir the fluid a low shear to disperse the fibers.
5. Pour the chelant based system with polylactide resin added into a Waring blender cup
6. Mix the fluid at low shear to prevent foaming and add 25 ml VES gelling agent
7. Mix for 5 minutes to allow the gelling agent to activate.

| Formation brine composition* | | | |
|---|---|---|---|
| Selected anions | Concentration (mg/L) | Selected cations | Concentration (mg/L) |
| Chloride | 13393 | Sodium | 6515 |
| Sulphate | 1408 | Calcium | 461 |
| Bicarbonate | 4107 | Magnesium | 538 |
| Carbonate | 0 | Barium | 3 |
| Hydroxide | 0 | Strontium | 9.4 |
| Bromide | 1945 | Potassium | 11478 |
| Boron | 39 | Lithium | 0.5 |

*As detailed in water analysis performed on sample

The preceding description has been presented with reference to some illustrative embodiments of the Inventors' concept. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

Furthermore, none of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle. The claims as filed are intended to be as comprehensive as possible, and no subject matter is intentionally relinquished, dedicated, or abandoned.

What is claimed is:

1. A method for treating a subterranean formation, comprising:
   forming a fluid comprising chelant and polylactide resin fiber; and
   introducing the fluid to a subterranean formation, wherein the temperature of the formation is about 300° F. or warmer,
   wherein the fluid forms a plug upon introduction to the formation.

2. The method of claim 1, wherein the chelant is trisodium hydroxyethylethylenediamine-triacetate.

3. The method of claim 1, wherein the fluid further comprises viscoelastic surfactant.

4. The method of claim 1, wherein the fluid further comprises corrosion inhibitor and hydrochloric acid.

5. The method of claim 1, further comprising allowing the fiber to hydrolyze.

6. The method of claim 1, wherein the plug is formed along a surface of the formation.

7. The method of claim 5, further comprising hydraulic fracturing or acid fracturing or both.

8. The method of claim 1, wherein the concentration of fibers in the fluid is about 50 ppm to about 100 ppm.

9. The method of claim 1, wherein the viscosity of the fluid is higher than if no fibers were present.

10. A method for treating a subterranean formation, comprising:
    forming a fluid comprising viscoelastic surfactant, trisodium hydroxyethylethylenediamine-triacetate and polylactide resin fiber; and
    introducing the fluid to a subterranean formation,
    wherein the fluid forms a plug upon introduction to the formation.

11. The method of claim 10, wherein the fluid further comprises corrosion inhibitor and hydrochloric acid.

12. The method of claim 10, further comprising allowing the fiber to hydrolyze.

13. The method of claim 10, wherein the plug is formed along a surface of the formation.

14. The method of claim 13, further comprising hydraulic fracturing or acid fracturing or both.

15. The method of claim 10, wherein the concentration of fibers in the fluid is about 50 ppm to about 100 ppm.

16. The method of claim 10, wherein the viscosity of the fluid is higher than if no fibers were present.

17. A method for treating a subterranean formation, comprising:
    forming a fluid comprising viscoelastic surfactant, trisodium hydroxyethylethylenediamine-triacetate and polylactide resin fiber; and
    introducing the fluid to a subterranean formation,
    wherein the temperature of the formation is about 300° F. or warmer, and
    wherein the fluid forms a plug upon introduction to the formation.

* * * * *